J. M. MEREDITH, Jr.
WHEEL RIM.
APPLICATION FILED MAR. 15, 1920.
1,362,433.
Patented Dec. 14, 1920.
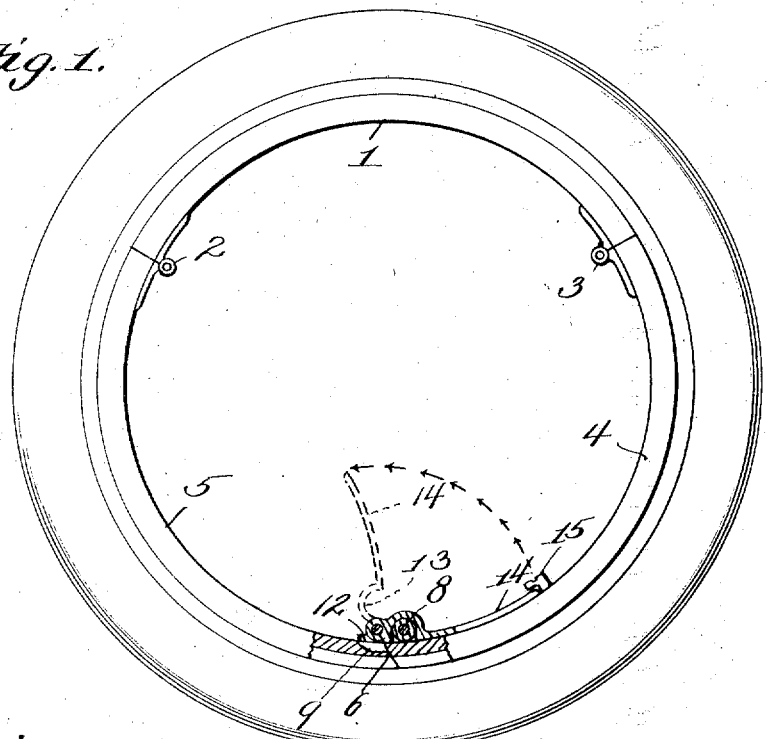
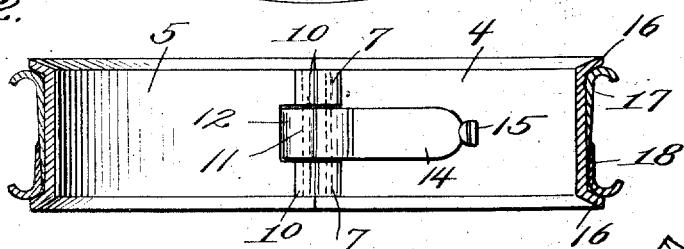
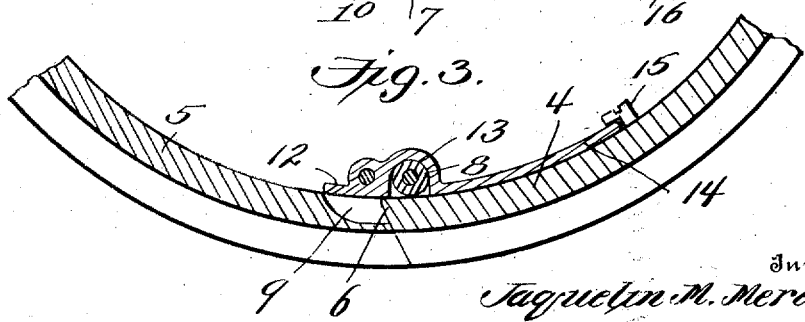
Inventor
Jaquelin M. Meredith Jr.
Witness
By
Attorney

UNITED STATES PATENT OFFICE.

JAQUELIN M. MEREDITH, JR., OF NORFOLK, VIRGINIA.

WHEEL-RIM.

1,362,433.       Specification of Letters Patent.       Patented Dec. 14, 1920.

Application filed March 15, 1920. Serial No. 365,927.

*To all whom it may concern:*

Be it known that I, JAQUELIN M. MEREDITH, Jr., a citizen of the United States, residing at Norfolk, in the county of Norfolk and State of Virginia, have invented new and useful Improvements in Wheel-Rims, of which the following is a specification.

This invention relates to collapsible and demountable rims and the objects are to provide a rim of great strength consisting of relatively few parts and more specifically to provide a rim having improved locking means whereby the rim may be held in distended position.

With the above and other objects in view my invention consists in certain features of structure, combination and relation which will be more fully set forth hereinafter. I have illustrated one embodiment of my invention in the accompanying drawings, wherein:

Figure 1 is a vertical section through a tire and rim embodying my invention.

Fig. 2 a plan view of a portion of a rim showing my improved locking means.

Fig. 3 is a section taken on lines 3—3 of Fig. 2.

Referring to the drawings, wherein similar numerals denote like parts throughout the several views.

I provide a rim 1 which consists of a plurality of hinged sections, three being shown in the embodiment illustrated. These sections are pivoted as at 2 and 3, thereby providing the relatively free and movable segment members 4 and 5.

The segment member 4 is formed with a beveled end face, as at 6, and on the inner face of this segment member adjacent the end are mounted a pair of ears 7. A roller or bead 8 is journaled in these ears.

The segment member 5 is recessed, as at 9, in its inner and end faces and above this recess a pair of ears 10 are mounted on the inner face of the segment member. A latching lever is journaled in these ear members, this latching lever consisting of a sleeve member 11 pivotally held between the ears 10 and a rearwardly extending arm 12. Adjacent and in front of its pivotal point, the lever is formed with an arcuate or concavo-convex portion 13 which is adapted to overlie the roller 8 of the segment member 4 when the lever is in locking position and the lever is further provided with a handle portion 14 which is adapted to be superimposed upon the inner face of the rim segment 4. A button 15 is mounted on the rim segment 4 by means of which the lever may be held in latching position.

The rim member is provided with annular side flanges 16 adapted to provide lateral support for any suitable two-part tire rim, the rim shown consisting of the annular portions 17 and 18 being at this time considered preferable.

In the operation of this device when it is desired to remove a tire from the rim, the button 15 is turned, the handle 14 of the lever lifted, which frees the arcuate portion 13 of the lever from the roller and the arm 12 of the lever passes into the slot 9, and as the lever is carried over acts upon the beveled edge 6 of the rim segment 4 to move that segment upon its pivot whereupon the rim may be further collapsed and the two-part rim carrying the tire readily removed.

Having now described my invention, I claim:—

1. In a device of the character described, a transversely split rim comprising a plurality of segment portions, said rim having two relatively free and movable segment portions, one of said segment portions being formed with a beveled end face, a roller on said segment end adjacent its beveled face, the other movable segment of said rim being provided with a recess, a lever pivoted to said second-named segment member adjacent said recess, said lever having a projecting arm and an arcuate portion adjacent its pivot whereby to partially surround said roller and a handle portion adapted to be superimposed upon the inner face of said first-named segment portion, and means for securing said handle portion in position.

2. In a device of the character described, a transversely split rim comprising a plurality of segment portions, said rim having two relatively free and movable segment members, one of said segment members being formed with a beveled end face, a roller mounted on said rim segment adjacent its beveled face, the other movable segment member being provided with a recess, ears carried by said second-named segment member adjacent said recess, a pin mounted in said ears, a lever including a sleeve portion surrounding said pin and having a rearwardly projecting arm, said lever being provided with an arcuate recess adjacent said sleeve and a handle portion adapted to be superimposed upon the inner face of said first-named segment member, and securing means carried by the first-named segment member whereby the lever handle may be retained in position on the rim segment.

In testimony whereof I have hereunto set my hand in presence of two subscribing witnesses.

JAQUELIN M. MEREDITH, JR.

Witnesses:
WALTER SIBERT,
H. D. MARTIN.